United States Patent
Morton et al.

(10) Patent No.: US 12,018,587 B1
(45) Date of Patent: Jun. 25, 2024

(54) TURBINE AIRFOIL HAVING COOLING HOLE ARRANGEMENT

(71) Applicant: RTX CORPORATION, Farmington, CT (US)

(72) Inventors: Jeffrey T. Morton, Manchester, CT (US); Johan K. Westin, Glastonbury, CT (US); Jason B. Moran, Monson, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/480,708

(22) Filed: Oct. 4, 2023

(51) Int. Cl.
  F01D 5/18      (2006.01)
  F01D 25/12     (2006.01)

(52) U.S. Cl.
  CPC ............ F01D 5/186 (2013.01); F01D 25/12 (2013.01); F05D 2220/32 (2013.01); F05D 2240/12 (2013.01); F05D 2240/30 (2013.01); F05D 2260/202 (2013.01)

(58) Field of Classification Search
  CPC ...... F01D 5/186; F01D 25/12; F05D 2220/32; F05D 2240/12; F05D 2240/30; F05D 2260/202
  See application file for complete search history.

(56) References Cited

U.S. PATENT DOCUMENTS

| | | | |
|---|---|---|---|
| 7,806,650 B2 | 10/2010 | Heyward et al. | |
| 8,707,712 B2* | 4/2014 | Spangler | F01D 25/12 |
| | | | 415/115 |
| 9,109,453 B2 | 8/2015 | Spangler et al. | |
| 9,115,597 B2* | 8/2015 | Spangler | F01D 9/041 |
| 9,322,279 B2* | 4/2016 | Spangler | F01D 9/065 |
| 9,957,894 B2* | 5/2018 | Deibel | F01D 5/186 |
| 10,036,271 B2* | 7/2018 | Ryan | F02C 3/04 |
| 10,107,140 B2* | 10/2018 | Ennacer | F01D 9/041 |
| 10,428,666 B2 | 10/2019 | Forbes et al. | |
| 10,443,434 B2 | 10/2019 | Ennacer et al. | |
| 10,648,363 B2* | 5/2020 | McMahon | F01D 25/12 |
| 10,844,729 B2* | 11/2020 | Arisi | B23H 1/00 |
| 10,871,083 B2* | 12/2020 | Cosher | F01D 25/12 |
| 11,041,390 B1* | 6/2021 | Cosher | F01D 5/186 |
| 11,346,230 B1* | 5/2022 | Schneider | F01D 5/02 |
| 2014/0010632 A1* | 1/2014 | Spangler | F01D 9/065 |
| | | | 415/115 |
| 2018/0106156 A1* | 4/2018 | LoRicco | F01D 9/065 |

* cited by examiner

Primary Examiner — Brian Christopher Delrue
(74) Attorney, Agent, or Firm — Carlson, Gaskey & Olds, P.C.

(57) ABSTRACT

A turbine airfoil includes a body that has inner and outer platforms and an airfoil section that extends between the inner and outer platforms. Cooling holes define external breakout points from the body. The external breakout points are located in accordance with Cartesian coordinates of at least points 1 through 11, 193 through 201, and 268 through 275 set forth in Table 1 herein.

20 Claims, 5 Drawing Sheets

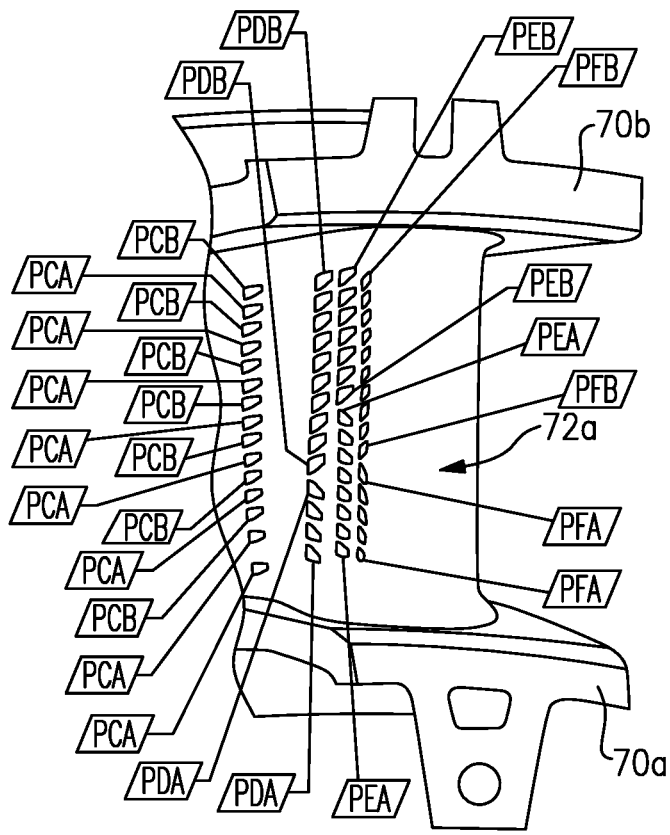
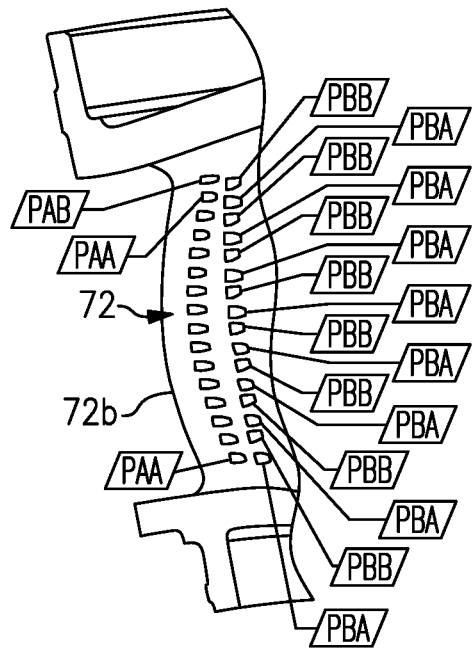
FIG.5
FIG.6
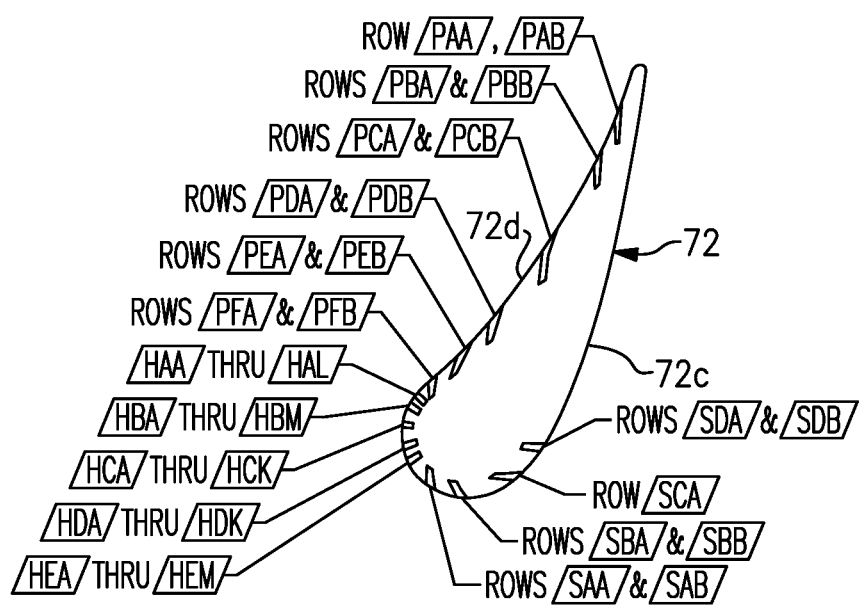
FIG.7

TURBINE AIRFOIL HAVING COOLING HOLE ARRANGEMENT

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow for the next set of blades. The turbine vanes include one or more airfoils that radially extend between inner and outer platforms or endwalls. Blades and vanes are generally referred to as "airfoils."

Turbine vanes and blades can include cooling features to provide a boundary layer of cooling fluid along external surfaces, which protects the airfoil from the hot combustion gases in the core flow path. Non-linear flow analyses and complex strain modeling are required to achieve good cooling, making practical results difficult to predict. Loading and temperature considerations also impose substantial design limitations, which cannot easily be generalized from one system to another.

SUMMARY

A turbine airfoil according to an example of the present disclosure includes a body that has inner and outer platforms and an airfoil section that extends between the inner and outer platforms, and cooling holes that define external breakout points from the body. The external breakout points are located in accordance with Cartesian coordinates of at least points 1 through 11, 193 through 201, and 268 through 275 set forth in Table 1.

In a further embodiment of any of the foregoing embodiments, the cooling holes having external breakout points in accordance with Cartesian coordinates of points 12 through 55 set forth in Table 1.

In a further embodiment of any of the foregoing embodiments, the cooling holes having external breakout points in accordance with Cartesian coordinates of points 56 through 102 set forth in Table 1.

In a further embodiment of any of the foregoing embodiments, the cooling holes having external breakout points in accordance with Cartesian coordinates of points 103 through 192 set forth in Table 1.

In a further embodiment of any of the foregoing embodiments, the cooling holes having external breakout points in accordance with Cartesian coordinates of points 202 through 267 set forth in Table 1.

In a further embodiment of any of the foregoing embodiments, the cooling holes having external breakout points in accordance with Cartesian coordinates of points 276 through 293 set forth in Table 1.

A gas turbine engine according to an example of the present disclosure includes a compressor section, a combustor, and a turbine section. The turbine section has an array of turbine airfoils as in any of the foregoing embodiments.

In a further embodiment of any of the foregoing embodiments, the cooling holes having external breakout points in accordance with Cartesian coordinates of points 12 through 55 set forth in Table 1.

In a further embodiment of any of the foregoing embodiments, the cooling holes having external breakout points in accordance with Cartesian coordinates of points 56 through 102 set forth in Table 1.

In a further embodiment of any of the foregoing embodiments, the cooling holes having external breakout points in accordance with Cartesian coordinates of points 103 through 192 set forth in Table 1.

In a further embodiment of any of the foregoing embodiments, the cooling holes having external breakout points in accordance with Cartesian coordinates of points 202 through 267 set forth in Table 1.

In a further embodiment of any of the foregoing embodiments, the cooling holes having external breakout points in accordance with Cartesian coordinates of points 276 through 293 set forth in Table 1.

A turbine airfoil according to an example of the present disclosure includes a body having inner and outer platforms and an airfoil section extending between the inner and outer platforms and cooling holes that define external breakout points from the body. The external breakout points are located in accordance with Cartesian coordinates of at least points 1 through 11 and 193 through 201 set forth in Table 1.

In a further embodiment of any of the foregoing embodiments, the cooling holes having external breakout points in accordance with Cartesian coordinates of points 12 through 55 set forth in Table 1.

In a further embodiment of any of the foregoing embodiments, the cooling holes having external breakout points in accordance with Cartesian coordinates of points 56 through 102 set forth in Table 1.

In a further embodiment of any of the foregoing embodiments, the cooling holes having external breakout points in accordance with Cartesian coordinates of points 103 through 146 set forth in Table 1.

In a further embodiment of any of the foregoing embodiments, the cooling holes having external breakout points in accordance with Cartesian coordinates of points 147 through 192 set forth in Table 1.

In a further embodiment of any of the foregoing embodiments, the cooling holes having external breakout points in accordance with Cartesian coordinates of points 268 through 275 set forth in Table 1.

In a further embodiment of any of the foregoing embodiments, the cooling holes having external breakout points in accordance with Cartesian coordinates of points 202 through 267 set forth in Table 1.

In a further embodiment of any of the foregoing embodiments, the cooling holes having external breakout points in accordance with Cartesian coordinates of points 276 through 293 set forth in Table 1.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates a portion of the airfoil section of the turbine airfoil of FIG. 3.

FIG. 6 illustrates another portion of the airfoil section of the turbine airfoil of FIG. 3.

FIG. 7 illustrates a section through the airfoil section of the turbine airfoil of FIG. 3.

DETAILED DESCRIPTION

Figure 1:
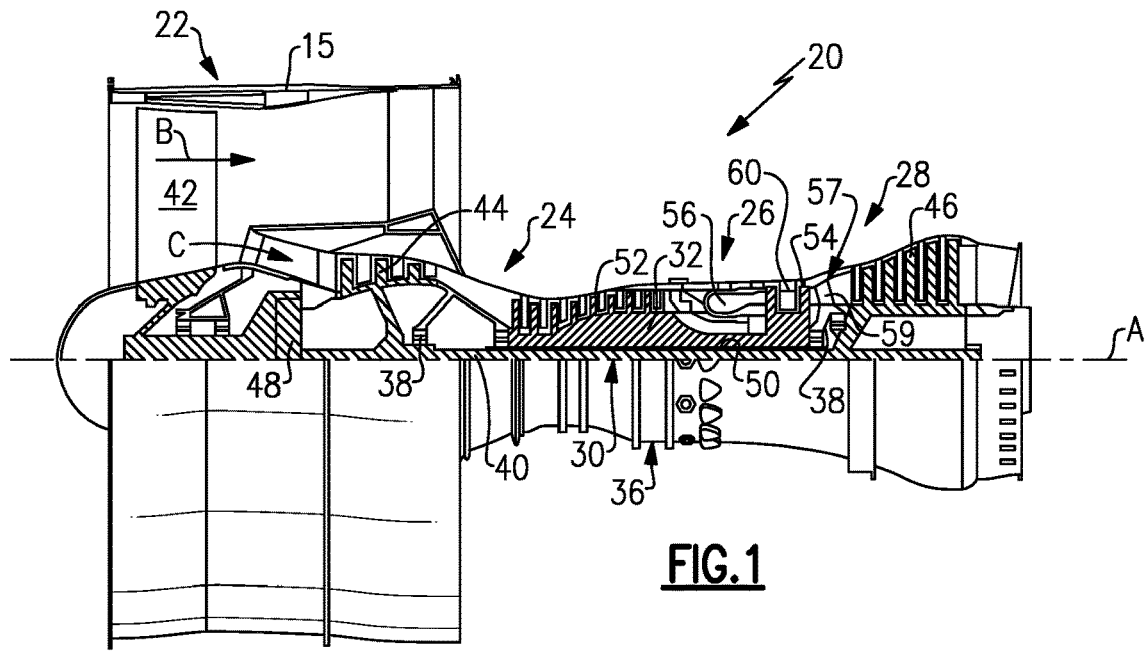
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression in the compressor section 24 and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
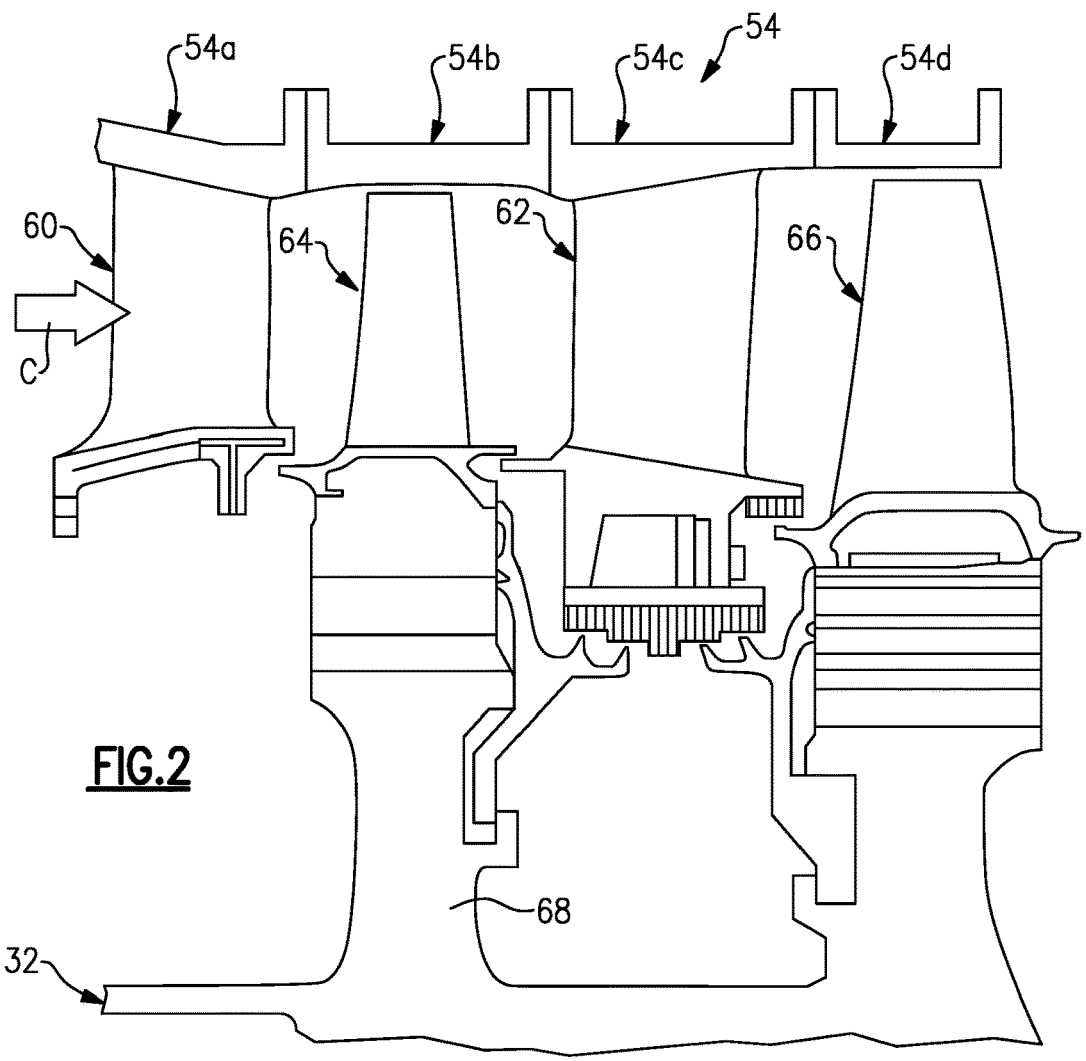
FIG. 2 illustrates selected portions of a high pressure turbine of the gas turbine engine.

FIG. 2 illustrates a cross-sectional view of a portion of the high pressure turbine section 54. The high pressure turbine section 54 includes first and second arrays 54a/54c of circumferentially spaced fixed vanes 60/62 (turbine airfoils). The arrays 54a/54c are axially spaced apart from one another. A first stage array 54b of circumferentially spaced turbine blades 64, mounted to a rotor disk 68, is arranged axially between the first and second fixed vane arrays 54a/54c. A second stage array 54d of circumferentially spaced turbine blades 66 is arranged aft of the second array 54c of fixed vanes 62.

Figure 3:
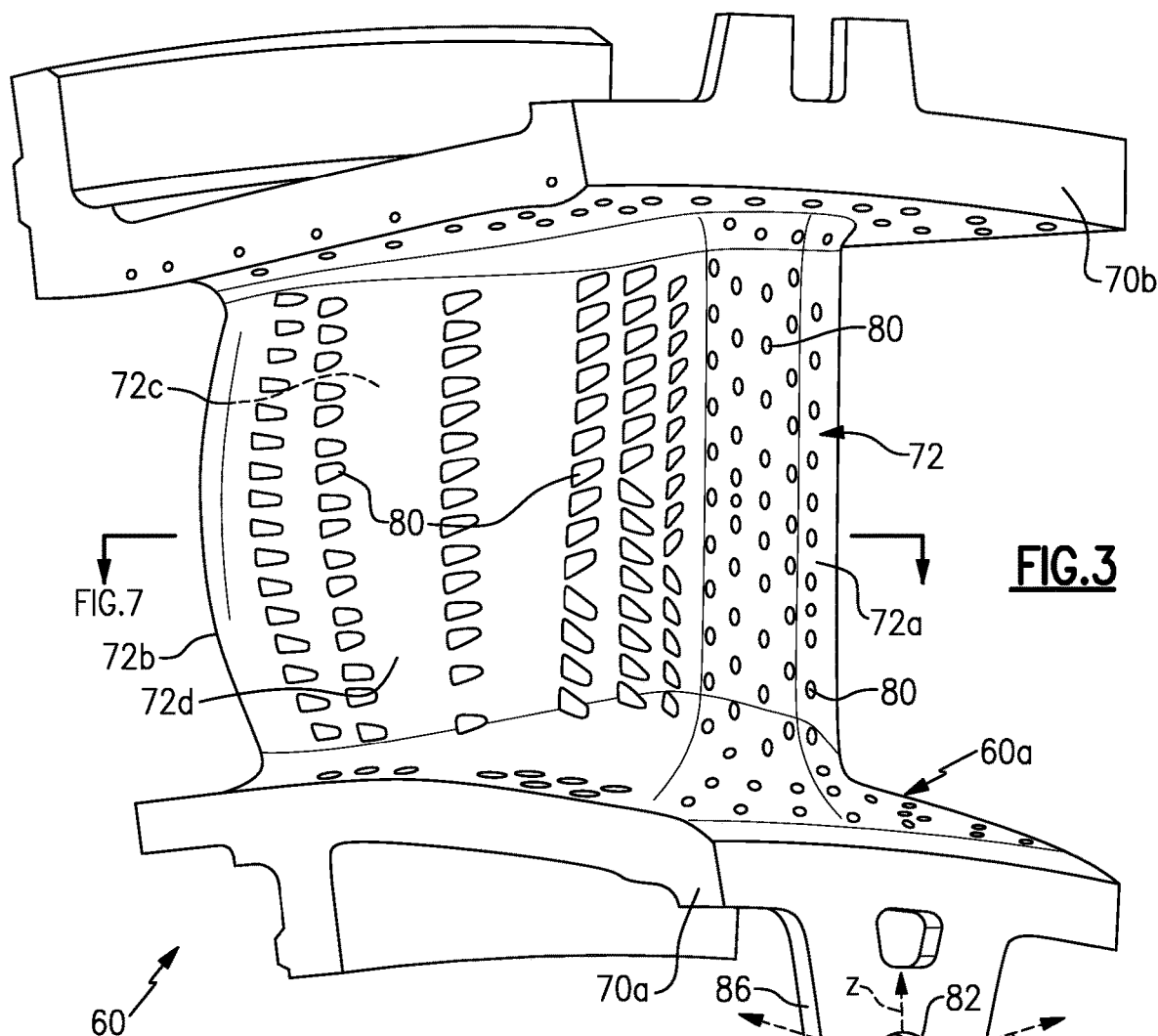
FIG. 3 illustrates an isolated view of a representative turbine airfoil of the high pressure turbine.

FIG. 3 shows an isolated view of a representative one of the vanes 60. The vane 60 includes a vane body 60a that includes at least inner and outer platforms 70a/70b and an airfoil section 72 that extends between the platforms 70a/70b. The airfoil section 72 includes leading and trailing edges 72a/72b that are joined by spaced apart first and second sides 72c/72d to provide an exterior airfoil surface. For example, the first side 72c is a suction side and the second side 72d is a pressure side.

The vane 60 may be formed of a high strength, heat resistant material, such as, but not limited to, a nickel-based or cobalt-based superalloy. In cooled configurations, internal fluid passages and external cooling apertures provide for a combination of convection and cooling. In addition, one or more thermal barrier coatings, abrasion-resistant coatings or other protective coatings may be applied to the vane 60, or at least portions thereof.

The vane 60 includes cooling holes 80. The cooling holes 80 are in fluid communication with cooling passages (not shown) within the vane 60. Generally, cooling air is bled from the compressor section 24 and fed into the cooling passages. The cooling air absorbs heat from internal surfaces in the vane 60 and is then discharged from the vane 60 through the cooling holes 80 to provide a film of cooling air across the exterior surfaces of the vane 60. The cooling holes 80 are located on the platforms 70a/70b and airfoil section 72.

Figure 4:
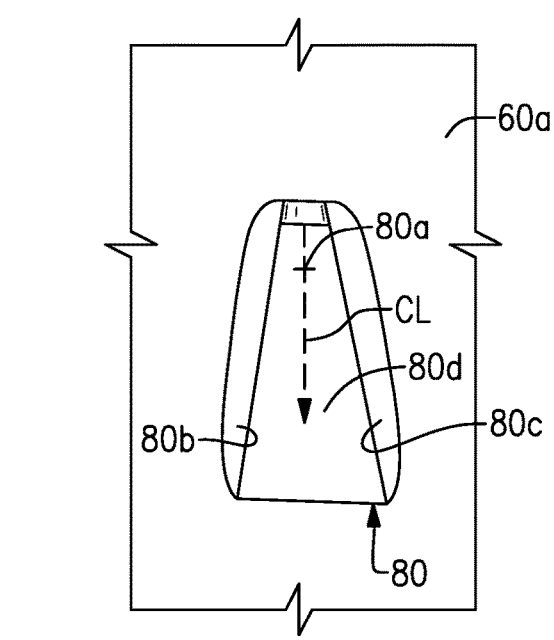
FIG. 4 illustrates a representative cooling hole.

FIG. 4 illustrates a representative example of one of the cooling holes 80. Each cooling hole 80 defines an external breakout point 80a from the vane body 60a. For instance, the external breakout point 80a is in the plane of or flush with the exterior surface of the vane body 60a. In the illustrated example, the cooling hole 80 is a divergent hole that is defined by divergent sides 80b/80c and a sloped bottom 80d. The cooling hole 80 defines a hole centerline, CL, that intersects the external breakout point 80a. For example, the centerline CL intersects the external breakout point 80a, and the divergent sides 80b/80c may diverge at a half-angle of 10° relative to the centerline CL. The angles may vary within a tolerance of +/−2°, but in additional examples the angles vary within +/−1° or within +/−0.5°.

The external breakout points 80a of the cooling holes 80 are located in accordance with Cartesian coordinates of points, or at least selected sets of points prescribed herein, set forth in Table 1 below. Referring to FIG. 3, the Cartesian coordinates are provided by an axial coordinate (X-coordinate), a circumferential coordinate (Y-coordinate), and a radial coordinate (Z-coordinate), relative to an origin point, which here is designated as reference-coordinate 82. The axial coordinate is along a direction parallel to the engine axis A, and is positive in the aft direction. The radial coordinate is along a direction perpendicular to the engine axis A, and is positive in a radially outwardly direction. The circumferential coordinate is along a circumferential direction about the engine axis A, and is positive consistent with a right-handed coordinate system.

In the illustrated example, the reference-coordinate 82 is taken with respect to a hole 84 on a tab 86 of the vane 60. The tab 86 extends radially inwards from the inner platform 70a of the vane 60, and a forward surface 86a of the tab 86 is substantially flush with a forward side of the inner platform 70a. The reference-point 82 is located at the centerpoint of the hole 84 flush with the forward surface 86a of the tab 86.

The coordinates of Table 1 (in inches) provide the nominal axial, circumferential, and radial coordinates relative to the reference-coordinate 82, on a cold, coated (with a metallic bondcoat of a nominal thickness that is substantially less than the tolerance of the cooling holes 80), stationary vane 60. As will be appreciated, the coordinates can equivalently be expressed in units other than inches, such as millimeters. Each row in Table 1 corresponds to a single cooling hole 80 and location of its external breakout point 80a from the vane body 60a.

The exact locations of the external breakout points 80a vary within a defined spatial envelope in order to account for manufacturing variations. The spatial envelope is a tolerance circle on the surface of the vane body 60a about the given coordinate. Herein, each external breakout point 80a in Table 1 is within a 0.100 inch diameter tolerance circle about the given Cartesian coordinate. That is, the given Cartesian coordinate is the centerpoint of the tolerance circle on the surface of the vane body 60a and the actual location of the corresponding external breakout point 80a lies within the tolerance circle. In further examples, the tolerance is tighter and the external breakout point 80a is within a 0.05 inch, or even a 0.01 inch, diameter tolerance circle about the given Cartesian coordinate in Table 1.

Figure 8:
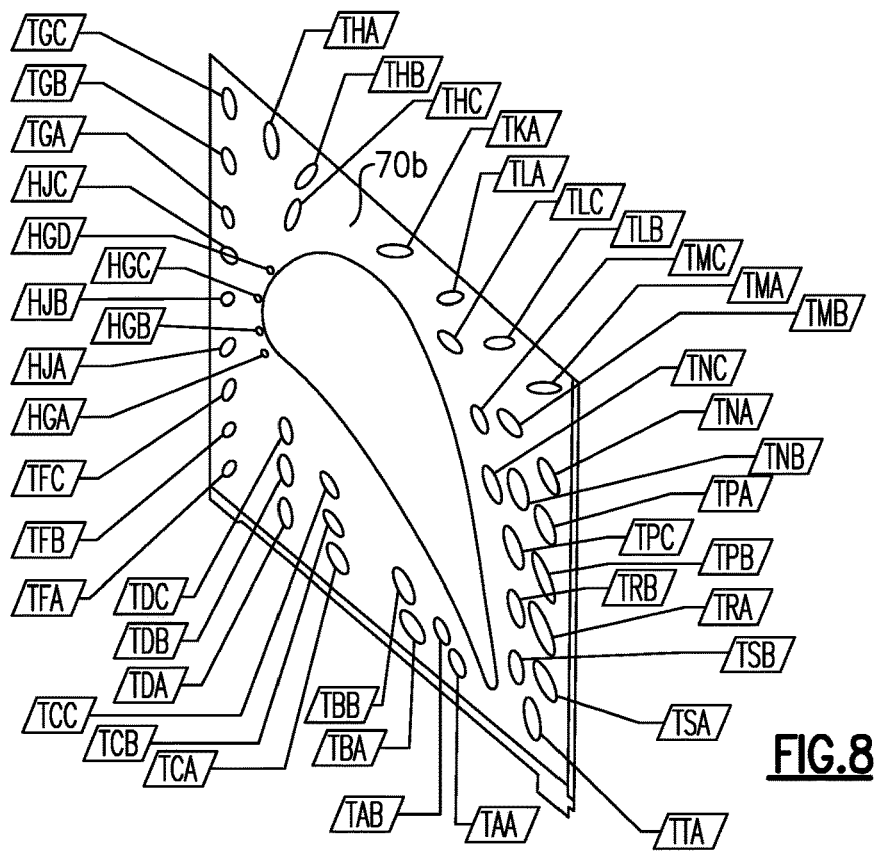
FIG. 8 illustrates the gas-path surface of the outer platform of the turbine airfoil of FIG. 3.
Figure 9:
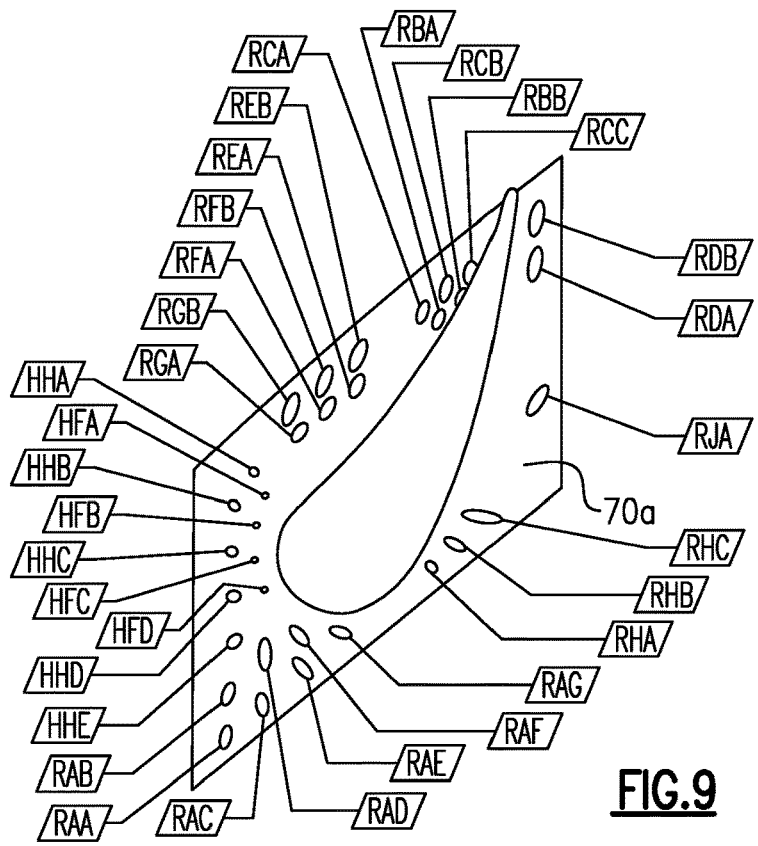
FIG. 9 illustrates the gas-path surface of the inner platform of the turbine airfoil of FIG. 3.
Figure 10:
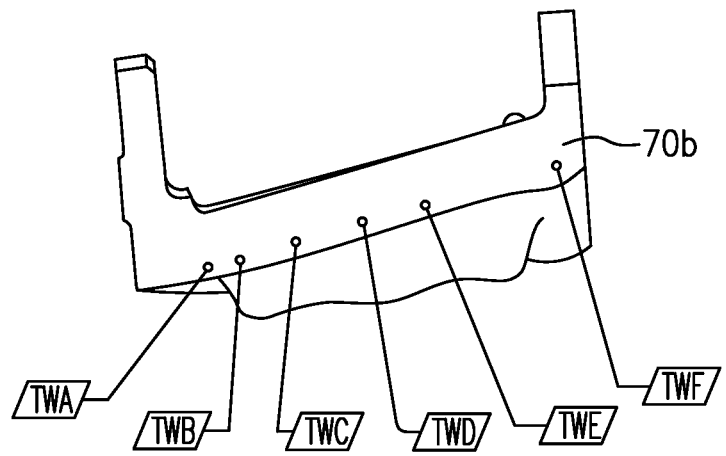
FIG. 10 illustrates another portion of the outer platform of the turbine airfoil of FIG. 3.
Figure 11:
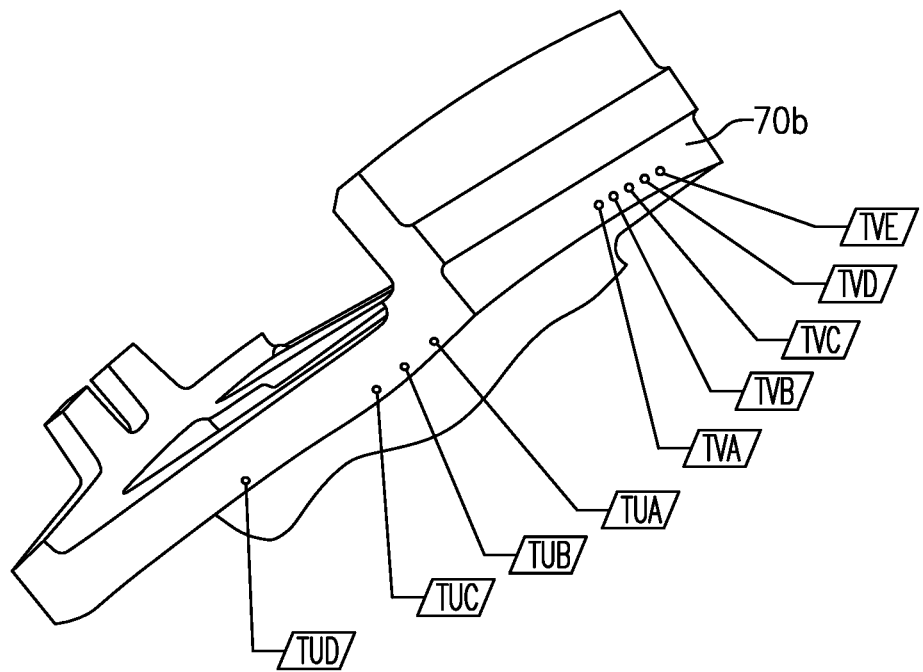
FIG. 11 illustrates another portion of the outer platform of the turbine airfoil of FIG. 3.

As discussed above, the cooling holes 80 are located in accordance with Cartesian coordinates of points, or at least selected sets of points prescribed herein, set forth in Table 1 below. Each numbered point in Table 1 is designated with a unique three-letter code that identifies each individual cooling hole 80. The first two letters of the three-letter code designate a row and the last letter designates the hole of that row (e.g., holes TBA, TBB, and TBC refer to holes A through C in the hole cluster TB). The cooling holes 80 are individually designated by their three-letter codes in FIGS. 5, 6, 7, 8, 9, 10, and 11. FIGS. 5 and 6 depict the second side 72d of the airfoil section 72, and FIGS. 10 and 11 depict edges of the outer platform 70b. FIG. 8 depicts the outer platform 70b and FIG. 9 depicts the inner platform 70a. FIG. 7 depicts a cross-section through the airfoil section 72.

The body vane 60a includes cooling holes 80 that have external breakout points 80a located in accordance with Cartesian coordinates of at least points 1 through 11, 193 through 201, and 268 through 275 set forth in Table 1 below. In an additional example, the body vane 60a also includes cooling holes 80 with external breakout points 80a located in accordance with Cartesian coordinates of points 12 through 55 set forth in Table 1. In an additional example, the body vane 60a also includes cooling holes 80 with external breakout points 80a located in accordance with Cartesian coordinates of points 56 through 102 set forth in Table 1. In an additional example, the body vane 60a also includes cooling holes 80 with external breakout points 80a located in accordance with Cartesian coordinates of points 103 through 192 set forth in Table 1. In an additional example, the body vane 60a also includes cooling holes 80 with external breakout points 80a located in accordance with Cartesian coordinates of points 202 through 267 set forth in Table 1. In an additional example, the body vane 60a also includes cooling holes 80 with external breakout points 80a located in accordance with Cartesian coordinates of points 276 through 293 set forth in Table 1.

It is to be further appreciated that the Cartesian coordinates of Table 1 may additionally or alternatively be equivalently represented with respect to one or more origin points other than the reference-coordinate 82. The Cartesian coordinates of Table 1 represent a spatial arrangement of the breakout points 80a of the cooling holes 80. The locations of the breakout points 80a in that spatial arrangement relative to one another are fixed, regardless of the location of the selected origin point.

TABLE 1

(within 0.100 inch or 0.05 inch diameter tolerance circle)

| Hole #: | Code: | X: | Y: | Z: |
|---|---|---|---|---|
| 1 | HAA | 0.380 | 0.471 | 0.984 |
| 2 | HAB | 0.394 | 0.464 | 1.116 |
| 3 | HAC | 0.397 | 0.464 | 1.250 |
| 4 | HAD | 0.399 | 0.463 | 1.384 |
| 5 | HAE | 0.398 | 0.462 | 1.517 |
| 6 | HAF | 0.400 | 0.462 | 1.651 |
| 7 | HAG | 0.400 | 0.463 | 1.785 |
| 8 | HAH | 0.400 | 0.463 | 1.919 |
| 9 | HAJ | 0.399 | 0.464 | 2.052 |
| 10 | HAK | 0.398 | 0.465 | 2.186 |
| 11 | HAL | 0.396 | 0.466 | 2.320 |
| 12 | HBA | 0.318 | 0.422 | 0.907 |
| 13 | HBB | 0.348 | 0.405 | 1.029 |
| 14 | HBC | 0.350 | 0.404 | 1.166 |
| 15 | HBD | 0.351 | 0.404 | 1.308 |
| 16 | HBE | 0.352 | 0.405 | 1.451 |
| 17 | HBF | 0.352 | 0.405 | 1.578 |
| 18 | HBG | 0.352 | 0.404 | 1.643 |
| 19 | HBH | 0.352 | 0.405 | 1.709 |
| 20 | HBJ | 0.352 | 0.405 | 1.837 |
| 21 | HBK | 0.352 | 0.405 | 1.978 |
| 22 | HBL | 0.352 | 0.406 | 2.120 |
| 23 | HBM | 0.353 | 0.410 | 2.271 |
| 24 | HCA | 0.305 | 0.327 | 0.928 |
| 25 | HCB | 0.323 | 0.324 | 1.079 |
| 26 | HCC | 0.323 | 0.325 | 1.244 |
| 27 | HCD | 0.323 | 0.325 | 1.405 |
| 28 | HCE | 0.323 | 0.326 | 1.529 |
| 29 | HCF | 0.323 | 0.326 | 1.644 |
| 30 | HCG | 0.323 | 0.326 | 1.763 |
| 31 | HCH | 0.323 | 0.325 | 1.935 |
| 32 | HCJ | 0.323 | 0.325 | 2.095 |
| 33 | HCK | 0.323 | 0.326 | 2.251 |
| 34 | HDA | 0.319 | 0.245 | 0.978 |
| 35 | HDB | 0.323 | 0.243 | 1.150 |
| 36 | HDC | 0.323 | 0.239 | 1.313 |
| 37 | HDD | 0.323 | 0.239 | 1.456 |
| 38 | HDE | 0.325 | 0.233 | 1.578 |
| 39 | HDF | 0.325 | 0.232 | 1.722 |
| 40 | HDG | 0.323 | 0.240 | 1.867 |
| 41 | HDH | 0.323 | 0.243 | 2.003 |
| 42 | HDJ | 0.322 | 0.246 | 2.163 |
| 43 | HDK | 0.322 | 0.246 | 2.296 |
| 44 | HEA | 0.312 | 0.144 | 0.856 |
| 45 | HEB | 0.344 | 0.165 | 0.962 |
| 46 | HEC | 0.347 | 0.167 | 1.100 |
| 47 | HED | 0.348 | 0.168 | 1.241 |
| 48 | HEE | 0.348 | 0.168 | 1.329 |
| 49 | HEF | 0.348 | 0.169 | 1.409 |
| 50 | HEG | 0.348 | 0.169 | 1.538 |
| 51 | HEH | 0.349 | 0.169 | 1.640 |
| 52 | HEJ | 0.349 | 0.169 | 1.768 |
| 53 | HEK | 0.348 | 0.169 | 1.910 |
| 54 | HEL | 0.350 | 0.165 | 2.053 |
| 55 | HEM | 0.353 | 0.159 | 2.194 |
| 56 | PAA | 1.130 | 1.355 | 0.958 |
| 57 | PAA | 1.138 | 1.392 | 1.042 |
| 58 | PAA | 1.145 | 1.425 | 1.126 |

TABLE 1-continued (within 0.100 inch or 0.05 inch diameter tolerance circle)

| Hole #: | Code: | X: | Y: | Z: |
|---|---|---|---|---|
| 59 | PAA | 1.150 | 1.454 | 1.210 |
| 60 | PAA | 1.155 | 1.478 | 1.294 |
| 61 | PAA | 1.159 | 1.498 | 1.379 |
| 62 | PAA | 1.161 | 1.514 | 1.463 |
| 63 | PAA | 1.163 | 1.525 | 1.547 |
| 64 | PAA | 1.163 | 1.532 | 1.631 |
| 65 | PAA | 1.163 | 1.534 | 1.715 |
| 66 | PAA | 1.161 | 1.531 | 1.800 |
| 67 | PAA | 1.159 | 1.525 | 1.884 |
| 68 | PAA | 1.155 | 1.514 | 1.968 |
| 69 | PAA | 1.150 | 1.499 | 2.053 |
| 70 | PAA | 1.145 | 1.479 | 2.137 |
| 71 | PAB | 1.145 | 1.470 | 2.221 |
| 72 | PBA | 1.069 | 1.242 | 0.961 |
| 73 | PBA | 1.072 | 1.282 | 1.133 |
| 74 | PBA | 1.075 | 1.312 | 1.296 |
| 75 | PBA | 1.077 | 1.336 | 1.462 |
| 76 | PBA | 1.079 | 1.354 | 1.625 |
| 77 | PBA | 1.081 | 1.367 | 1.788 |
| 78 | PBA | 1.083 | 1.373 | 1.953 |
| 79 | PBA | 1.085 | 1.372 | 2.117 |
| 80 | PBB | 1.074 | 1.274 | 1.067 |
| 81 | PBB | 1.077 | 1.306 | 1.232 |
| 82 | PBB | 1.079 | 1.332 | 1.392 |
| 83 | PBB | 1.081 | 1.352 | 1.557 |
| 84 | PBB | 1.083 | 1.367 | 1.722 |
| 85 | PBB | 1.085 | 1.377 | 1.888 |
| 86 | PBB | 1.087 | 1.379 | 2.044 |
| 87 | PBB | 1.089 | 1.373 | 2.200 |
| 88 | PCA | 0.901 | 0.993 | 0.992 |
| 89 | PCA | 0.900 | 1.007 | 1.136 |
| 90 | PCA | 0.897 | 1.018 | 1.321 |
| 91 | PCA | 0.894 | 1.024 | 1.486 |
| 92 | PCA | 0.890 | 1.029 | 1.650 |
| 93 | PCA | 0.887 | 1.032 | 1.814 |
| 94 | PCA | 0.883 | 1.034 | 1.977 |
| 95 | PCA | 0.879 | 1.034 | 2.140 |
| 96 | PCB | 0.899 | 1.015 | 1.249 |
| 97 | PCB | 0.896 | 1.023 | 1.410 |
| 98 | PCB | 0.892 | 1.028 | 1.577 |
| 99 | PCB | 0.888 | 1.031 | 1.743 |
| 100 | PCB | 0.885 | 1.033 | 1.906 |
| 101 | PCB | 0.880 | 1.034 | 2.070 |
| 102 | PCB | 0.876 | 1.033 | 2.231 |
| 103 | PDA | 0.695 | 0.749 | 1.032 |
| 104 | PDA | 0.690 | 0.744 | 1.127 |
| 105 | PDA | 0.684 | 0.739 | 1.223 |
| 106 | PDA | 0.679 | 0.734 | 1.318 |
| 107 | PDB | 0.678 | 0.735 | 1.474 |
| 108 | PDB | 0.674 | 0.731 | 1.565 |
| 109 | PDB | 0.669 | 0.727 | 1.656 |
| 110 | PDB | 0.665 | 0.723 | 1.746 |
| 111 | PDB | 0.660 | 0.720 | 1.836 |
| 112 | PDB | 0.656 | 0.718 | 1.926 |
| 113 | PDB | 0.652 | 0.716 | 2.015 |
| 114 | PDB | 0.648 | 0.715 | 2.105 |
| 115 | PDB | 0.644 | 0.715 | 2.193 |
| 116 | PDB | 0.640 | 0.716 | 2.282 |
| 117 | PEA | 0.563 | 0.616 | 1.058 |
| 118 | PEA | 0.563 | 0.613 | 1.141 |
| 119 | PEA | 0.562 | 0.612 | 1.225 |
| 120 | PEA | 0.562 | 0.610 | 1.309 |
| 121 | PEA | 0.562 | 0.609 | 1.392 |
| 122 | PEA | 0.563 | 0.608 | 1.477 |
| 123 | PEA | 0.563 | 0.608 | 1.561 |
| 124 | PEA | 0.564 | 0.609 | 1.645 |
| 125 | PEB | 0.564 | 0.610 | 1.782 |
| 126 | PEB | 0.561 | 0.608 | 1.870 |
| 127 | PEB | 0.558 | 0.607 | 1.957 |
| 128 | PEB | 0.555 | 0.606 | 2.044 |
| 129 | PEB | 0.553 | 0.606 | 2.130 |
| 130 | PEB | 0.551 | 0.607 | 2.216 |
| 131 | PEB | 0.549 | 0.609 | 2.301 |
| 132 | PFA | 0.477 | 0.544 | 1.039 |
| 133 | PFA | 0.479 | 0.538 | 1.123 |
| 134 | PFA | 0.480 | 0.537 | 1.213 |

TABLE 1-continued (within 0.100 inch or 0.05 inch diameter tolerance circle)

| Hole #: | Code: | X: | Y: | Z: |
|---|---|---|---|---|
| 135 | PFA | 0.482 | 0.536 | 1.303 |
| 136 | PFA | 0.484 | 0.535 | 1.394 |
| 137 | PFB | 0.489 | 0.538 | 1.532 |
| 138 | PFB | 0.488 | 0.535 | 1.616 |
| 139 | PFB | 0.487 | 0.534 | 1.700 |
| 140 | PFB | 0.485 | 0.532 | 1.784 |
| 141 | PFB | 0.484 | 0.532 | 1.867 |
| 142 | PFB | 0.483 | 0.531 | 1.950 |
| 143 | PFB | 0.482 | 0.531 | 2.032 |
| 144 | PFB | 0.481 | 0.532 | 2.114 |
| 145 | PFB | 0.479 | 0.533 | 2.196 |
| 146 | PFB | 0.478 | 0.535 | 2.277 |
| 147 | SAA | 0.446 | 0.055 | 0.951 |
| 148 | SAA | 0.446 | 0.059 | 1.039 |
| 149 | SAA | 0.446 | 0.063 | 1.128 |
| 150 | SAA | 0.445 | 0.066 | 1.218 |
| 151 | SAB | 0.444 | 0.070 | 1.338 |
| 152 | SAB | 0.444 | 0.071 | 1.424 |
| 153 | SAB | 0.444 | 0.072 | 1.510 |
| 154 | SAB | 0.444 | 0.073 | 1.595 |
| 155 | SAB | 0.444 | 0.073 | 1.680 |
| 156 | SAB | 0.445 | 0.073 | 1.765 |
| 157 | SAB | 0.445 | 0.073 | 1.849 |
| 158 | SAB | 0.445 | 0.072 | 1.933 |
| 159 | SAB | 0.445 | 0.071 | 2.016 |
| 160 | SAB | 0.446 | 0.069 | 2.100 |
| 161 | SAB | 0.446 | 0.067 | 2.182 |
| 162 | SAB | 0.446 | 0.065 | 2.265 |
| 163 | SBA | 0.556 | 0.020 | 0.972 |
| 164 | SBA | 0.555 | 0.023 | 1.051 |
| 165 | SBA | 0.554 | 0.025 | 1.130 |
| 166 | SBA | 0.554 | 0.027 | 1.209 |
| 167 | SBA | 0.554 | 0.029 | 1.289 |
| 168 | SBA | 0.554 | 0.031 | 1.369 |
| 169 | SBA | 0.554 | 0.032 | 1.450 |
| 170 | SBA | 0.554 | 0.033 | 1.531 |
| 171 | SBB | 0.555 | 0.034 | 1.641 |
| 172 | SBB | 0.554 | 0.034 | 1.721 |
| 173 | SBB | 0.552 | 0.035 | 1.800 |
| 174 | SBB | 0.551 | 0.035 | 1.880 |
| 175 | SBB | 0.550 | 0.034 | 1.959 |
| 176 | SBB | 0.549 | 0.034 | 2.038 |
| 177 | SBB | 0.548 | 0.033 | 2.117 |
| 178 | SBB | 0.547 | 0.032 | 2.195 |
| 179 | SBB | 0.547 | 0.030 | 2.273 |
| 180 | SCA | 0.773 | 0.117 | 1.103 |
| 181 | SCA | 0.775 | 0.117 | 1.185 |
| 182 | SCA | 0.776 | 0.117 | 1.267 |
| 183 | SCA | 0.777 | 0.118 | 1.350 |
| 184 | SCA | 0.778 | 0.118 | 1.433 |
| 185 | SCA | 0.779 | 0.119 | 1.517 |
| 186 | SCA | 0.779 | 0.119 | 1.600 |
| 187 | SCA | 0.779 | 0.119 | 1.684 |
| 188 | SCA | 0.778 | 0.120 | 1.769 |
| 189 | SCA | 0.777 | 0.120 | 1.853 |
| 190 | SCA | 0.776 | 0.121 | 1.938 |
| 191 | SCA | 0.774 | 0.122 | 2.024 |
| 192 | SCA | 0.772 | 0.122 | 2.109 |
| 193 | SDA | 0.932 | 0.333 | 1.097 |
| 194 | SDA | 0.932 | 0.330 | 1.230 |
| 195 | SDA | 0.932 | 0.325 | 1.363 |
| 196 | SDA | 0.930 | 0.320 | 1.495 |
| 197 | SDA | 0.926 | 0.314 | 1.626 |
| 198 | SDB | 0.921 | 0.308 | 1.758 |
| 199 | SDB | 0.914 | 0.300 | 1.891 |
| 200 | SDB | 0.905 | 0.291 | 2.024 |
| 201 | SDB | 0.894 | 0.281 | 2.158 |
| 202 | HFA | 0.277 | 0.492 | 0.818 |
| 203 | HFB | 0.241 | 0.377 | 0.812 |
| 204 | HFC | 0.238 | 0.242 | 0.805 |
| 205 | HFD | 0.275 | 0.124 | 0.800 |
| 206 | HHA | 0.231 | 0.581 | 0.764 |
| 207 | HHB | 0.155 | 0.451 | 0.742 |
| 208 | HHC | 0.149 | 0.274 | 0.738 |
| 209 | HHD | 0.157 | 0.100 | 0.722 |
| 210 | HHE | 0.165 | −0.073 | 0.707 |
| 211 | RAA | 0.133 | −0.438 | 0.653 |
| 212 | RAB | 0.143 | −0.269 | 0.679 |
| 213 | RAC | 0.271 | −0.308 | 0.704 |
| 214 | RAD | 0.283 | −0.101 | 0.731 |
| 215 | RAE | 0.420 | −0.167 | 0.756 |
| 216 | RAF | 0.404 | −0.038 | 0.773 |
| 217 | RAG | 0.567 | −0.031 | 0.816 |
| 218 | RBA | 0.953 | 1.184 | 0.844 |
| 219 | RBB | 1.044 | 1.274 | 0.844 |
| 220 | RCA | 0.890 | 1.209 | 0.840 |
| 221 | RCB | 0.983 | 1.296 | 0.831 |
| 222 | RCC | 1.081 | 1.367 | 0.828 |
| 223 | RDA | 1.335 | 1.391 | 0.821 |
| 224 | RDB | 1.340 | 1.570 | 0.797 |
| 225 | REA | 0.631 | 0.920 | 0.836 |
| 226 | REB | 0.626 | 1.024 | 0.829 |
| 227 | RFA | 0.514 | 0.825 | 0.815 |
| 228 | RFB | 0.495 | 0.917 | 0.805 |
| 229 | RGA | 0.403 | 0.731 | 0.800 |
| 230 | RGB | 0.368 | 0.808 | 0.780 |
| 231 | RHA | 0.930 | 0.233 | 0.868 |
| 232 | RHB | 1.010 | 0.326 | 0.866 |
| 233 | RHC | 1.096 | 0.432 | 0.868 |
| 234 | RJA | 1.339 | 0.862 | 0.864 |
| 235 | HGA | 0.341 | 0.437 | 2.450 |
| 236 | HGB | 0.321 | 0.348 | 2.422 |
| 237 | HGC | 0.320 | 0.234 | 2.415 |
| 238 | HGD | 0.366 | 0.124 | 2.414 |
| 239 | HJA | 0.198 | 0.409 | 2.514 |
| 240 | HJB | 0.195 | 0.233 | 2.510 |
| 241 | HJC | 0.201 | 0.073 | 2.500 |
| 242 | TAA | 1.104 | 1.605 | 2.305 |
| 243 | TAB | 1.041 | 1.481 | 2.331 |
| 244 | TBA | 0.914 | 1.457 | 2.355 |
| 245 | TBB | 0.883 | 1.296 | 2.376 |
| 246 | TCA | 0.605 | 1.196 | 2.433 |
| 247 | TCB | 0.601 | 1.068 | 2.442 |
| 248 | TCC | 0.598 | 0.920 | 2.450 |
| 249 | TDA | 0.417 | 1.030 | 2.477 |
| 250 | TDB | 0.418 | 0.863 | 2.485 |
| 251 | TDC | 0.418 | 0.713 | 2.488 |
| 252 | TFA | 0.202 | 0.878 | 2.508 |
| 253 | TFB | 0.202 | 0.728 | 2.512 |
| 254 | TFC | 0.203 | 0.570 | 2.513 |
| 255 | TGA | 0.200 | −0.068 | 2.490 |
| 256 | TGB | 0.204 | −0.274 | 2.471 |
| 257 | TGC | 0.204 | −0.487 | 2.447 |
| 258 | THA | 0.370 | −0.341 | 2.448 |
| 259 | THB | 0.493 | −0.219 | 2.439 |
| 260 | THC | 0.444 | −0.064 | 2.461 |
| 261 | TKA | 0.827 | 0.038 | 2.401 |
| 262 | TLA | 1.063 | 0.215 | 2.370 |
| 263 | TLB | 1.257 | 0.378 | 2.344 |
| 264 | TLC | 1.057 | 0.367 | 2.376 |
| 265 | TMA | 1.427 | 0.547 | 2.347 |
| 266 | TMB | 1.304 | 0.669 | 2.343 |
| 267 | TMC | 1.186 | 0.653 | 2.354 |
| 268 | TNA | 1.457 | 0.860 | 2.344 |
| 269 | TNB | 1.339 | 0.906 | 2.337 |
| 270 | TNC | 1.235 | 0.896 | 2.341 |
| 271 | TPA | 1.443 | 1.048 | 2.334 |
| 272 | TPB | 1.435 | 1.235 | 2.321 |
| 273 | TPC | 1.319 | 1.129 | 2.325 |
| 274 | TRA | 1.427 | 1.422 | 2.303 |
| 275 | TRB | 1.338 | 1.375 | 2.304 |
| 276 | TSA | 1.447 | 1.657 | 2.276 |
| 277 | TSB | 1.343 | 1.609 | 2.278 |
| 278 | TTA | 1.408 | 1.803 | 2.253 |
| 279 | TUA | 1.424 | 0.395 | 2.385 |
| 280 | TUB | 1.319 | 0.307 | 2.386 |
| 281 | TUC | 1.220 | 0.224 | 2.385 |
| 282 | TUD | 0.785 | −0.141 | 2.436 |
| 283 | TVA | 1.562 | 1.433 | 2.375 |
| 284 | TVB | 1.562 | 1.528 | 2.366 |
| 285 | TVC | 1.562 | 1.622 | 2.356 |
| 286 | TVD | 1.562 | 1.717 | 2.345 |

TABLE 1-continued (within 0.100 inch or 0.05 inch diameter tolerance circle)

| Hole #: | Code: | X: | Y: | Z: |
|---|---|---|---|---|
| 287 | TVE | 1.562 | 1.812 | 2.333 |
| 288 | TWA | 1.332 | 1.924 | 2.281 |
| 289 | TWB | 1.232 | 1.842 | 2.302 |
| 290 | TWC | 1.048 | 1.695 | 2.352 |
| 291 | TWD | 0.839 | 1.527 | 2.407 |
| 292 | TWE | 0.635 | 1.362 | 2.455 |
| 293 | TWF | 0.221 | 1.030 | 2.565 |

Conformance in accordance with the coordinates of Table 1 is based on points representing the locations of the breakout points 80a of the cooling holes 80, for example in inches. A conforming turbine airfoil has cooling holes with breakout points located in accordance with the specified sets of points, within the tolerance circle.

Conformance can alternatively be based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, conformance encompasses a determination that a particular part or structure is identical to, or sufficiently similar to, the specified turbine airfoil, or that the part or structure is sufficiently the same with respect to a part design in a type-certified or type-certificated turbine airfoil, such that the part or structure complies with airworthiness standards applicable to the specified turbine airfoil. In particular, conformance encompasses any regulatory determination that a particular part or structure is sufficiently similar to, identical to, or the same as a specified turbine airfoil, such that certification or authorization for use is based at least in part on the determination of similarity.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine airfoil comprising:
    a body having inner and outer platforms and an airfoil section extending between the inner and outer platforms; and
    cooling holes that define external breakout points from the body, the external breakout points being located in accordance with Cartesian coordinates of at least points 1 through 11, 193 through 201, and 268 through 275 set forth in Table 1.

2. The turbine airfoil as recited in claim 1, wherein the cooling holes having external breakout points in accordance with Cartesian coordinates of points 12 through 55 set forth in Table 1.

3. The turbine airfoil as recited in claim 1, wherein the cooling holes having external breakout points in accordance with Cartesian coordinates of points 56 through 102 set forth in Table 1.

4. The turbine airfoil as recited in claim 1, wherein the cooling holes having external breakout points in accordance with Cartesian coordinates of points 103 through 192 set forth in Table 1.

5. The turbine airfoil as recited in claim 4, wherein the cooling holes having external breakout points in accordance with Cartesian coordinates of points 202 through 267 set forth in Table 1.

6. The turbine airfoil as recited in claim 5, wherein the cooling holes having external breakout points in accordance with Cartesian coordinates of points 276 through 293 set forth in Table 1.

7. A gas turbine engine comprising:
    a compressor section;
    a combustor; and
    a turbine section, the turbine section including an array of turbine airfoils, each turbine airfoil comprising:
        a body having inner and outer platforms and an airfoil section extending between the inner and outer platforms, and
        cooling holes that define external breakout points from the body, the external breakout points being located in accordance with Cartesian coordinates of at least points 1 through 11, 193 through 201, and 268 through 275 set forth in Table 1.

8. The gas turbine engine as recited in claim 7, wherein the cooling holes having external breakout points in accordance with Cartesian coordinates of points 12 through 55 set forth in Table 1.

9. The gas turbine engine as recited in claim 7, wherein the cooling holes having external breakout points in accordance with Cartesian coordinates of points 56 through 102 set forth in Table 1.

10. The gas turbine engine as recited in claim 7, wherein the cooling holes having external breakout points in accordance with Cartesian coordinates of points 103 through 192 set forth in Table 1.

11. The gas turbine engine as recited in claim 10, wherein the cooling holes having external breakout points in accordance with Cartesian coordinates of points 202 through 267 set forth in Table 1.

12. The gas turbine engine as recited in claim 11, wherein the cooling holes having external breakout points in accordance with Cartesian coordinates of points 276 through 293 set forth in Table 1.

13. A turbine airfoil comprising:
    a body having inner and outer platforms and an airfoil section extending between the inner and outer platforms; and
    cooling holes that define external breakout points from the body, the external breakout points being located in accordance with Cartesian coordinates of at least points 1 through 11 and 193 through 201 set forth in Table 1.

14. The turbine airfoil as recited in claim 13, wherein the cooling holes having external breakout points in accordance with Cartesian coordinates of points 12 through 55 set forth in Table 1.

15. The turbine airfoil as recited in claim 14, wherein the cooling holes having external breakout points in accordance with Cartesian coordinates of points 56 through 102 set forth in Table 1.

16. The turbine airfoil as recited in claim 15, wherein the cooling holes having external breakout points in accordance with Cartesian coordinates of points 103 through 146 set forth in Table 1.

17. The turbine airfoil as recited in claim 16, wherein the cooling holes having external breakout points in accordance with Cartesian coordinates of points 147 through 192 set forth in Table 1.

18. The turbine airfoil as recited in claim 17, wherein the cooling holes having external breakout points in accordance with Cartesian coordinates of points 268 through 275 set forth in Table 1.

19. The turbine airfoil as recited in claim 18, wherein the cooling holes having external breakout points in accordance with Cartesian coordinates of points 202 through 267 set forth in Table 1.

20. The turbine airfoil as recited in claim 19, wherein the cooling holes having external breakout points in accordance with Cartesian coordinates of points 276 through 293 set forth in Table 1.

* * * * *